United States Patent Office 3,002,971
Patented Oct. 3, 1961

3,002,971
18-OXYGENATED STEROIDS AND PROCESS FOR THEIR MANUFACTURE
Albert Wettstein and Karl Heusler, Basel, Hellmut Ueberwasser, Riehen, and Peter Wieland, Basel, Switzerland, assignors to Ciba Pharmaceutical Products Inc., Summit, N.J.
No Drawing. Filed Nov. 28, 1958, Ser. No. 776,692
Claims priority, application Switzerland Dec. 5, 1957
18 Claims. (Cl. 260—239.55)

Among the 18-oxygenated steroids the hormone aldosterone isolated from adrenal glands, is of extreme importance, more especially because of its specific effect on the mineral metabolism. Since, however, on one hand, the quantities in which it occurs in animal organs are too small for producing the hormone economically, and since, on the other hand, it has hitherto not been possible to prepare aldosterone by partial synthesis from other naturally occurring steroids, its manufacture by total synthesis is of considerable industrial importance.

The present invention provides a new process for synthesising aldosterone and its derivatives in a simple manner from a $\Delta^{4,18}$-3:16-dioxo-11$\beta$:18a-oxido-18a-methyl-18-homoandrostene of the formula

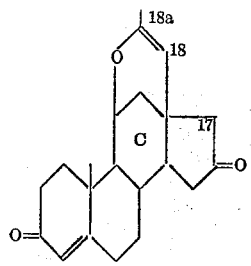

or from a corresponding 3-ketal which may also contain a further double bond in the 14:15-position.

The new process can be subdivided into four main parts:
(A) Degradation of the cyclic enol ether grouping at ring C to the 18:11-cyclo-semiacetal structure typical of aldosterone;
(B) condensation with an oxalic acid ester in the 17-position and formation of derivatives to protect the 20-oxo group;
(C) hydrogenation of the 14:15-double bond and elimination of the oxygen grouping in the 16-position; and
(D) conversion of the side chain into the ketol side chain of aldosterone.

One variant of the synthesis is represented by the following formula scheme:

PART A

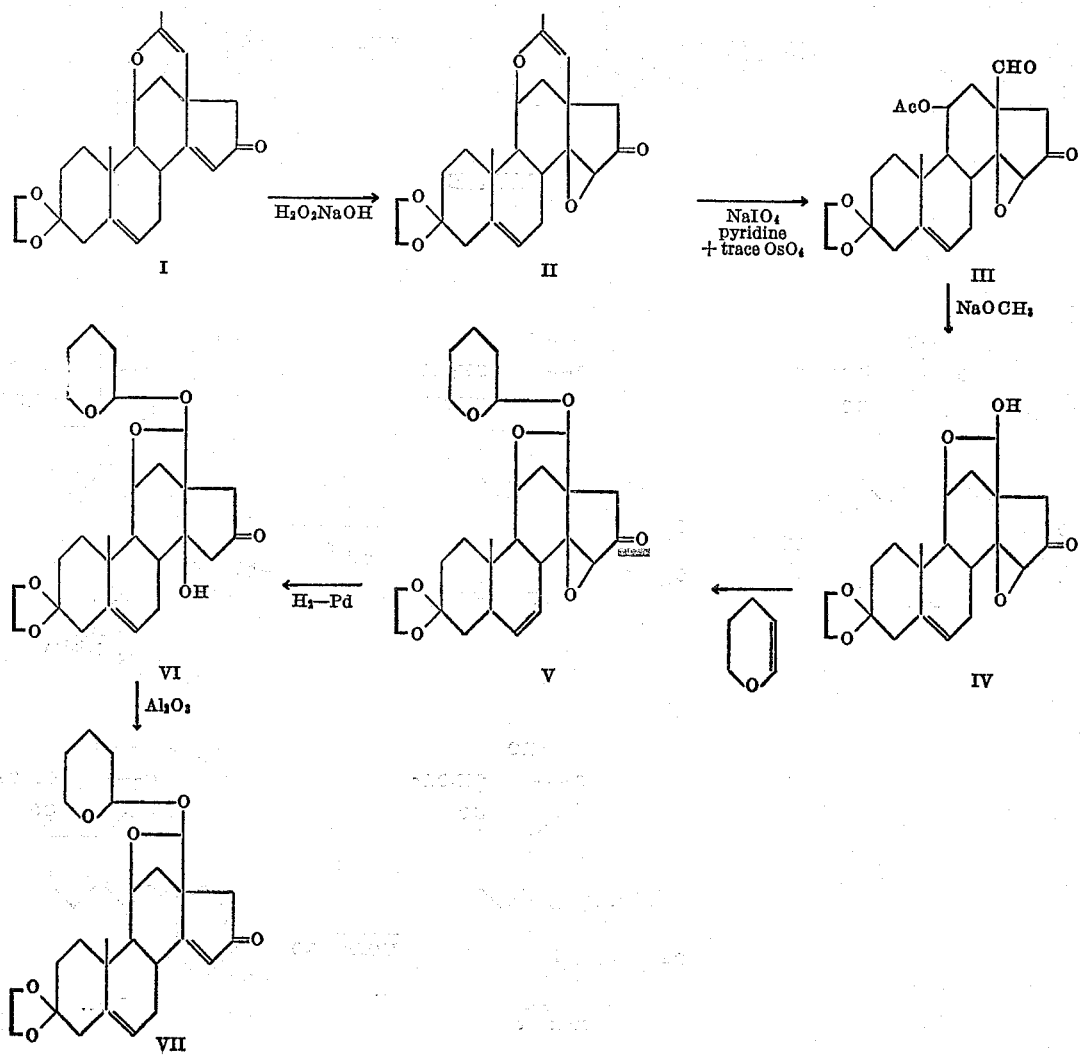

PART B
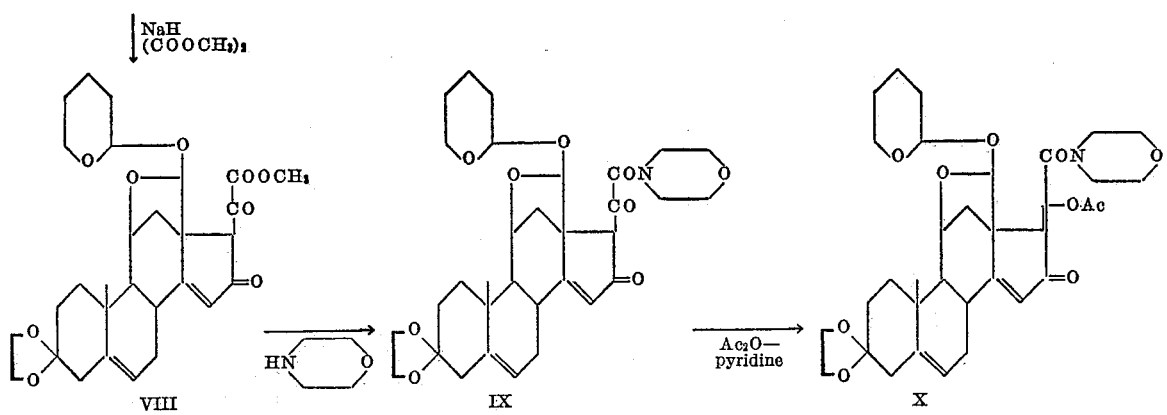
PART C
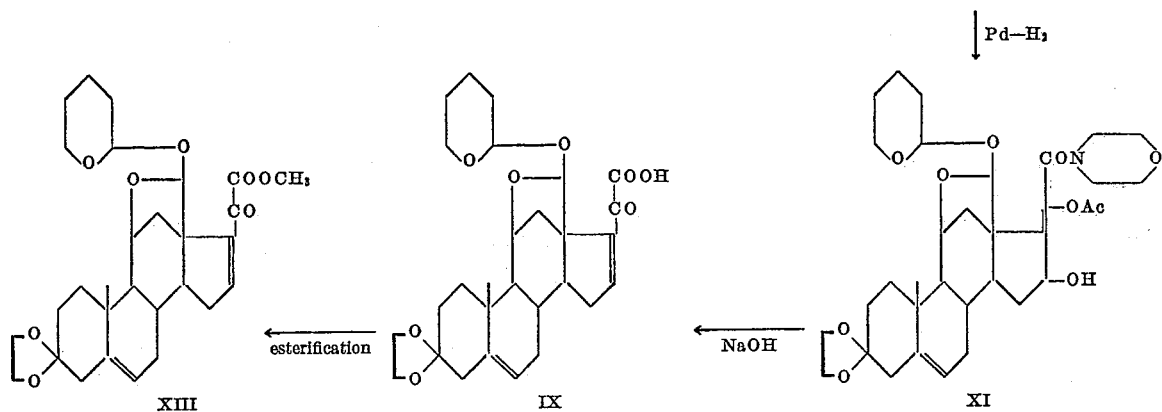
PART D
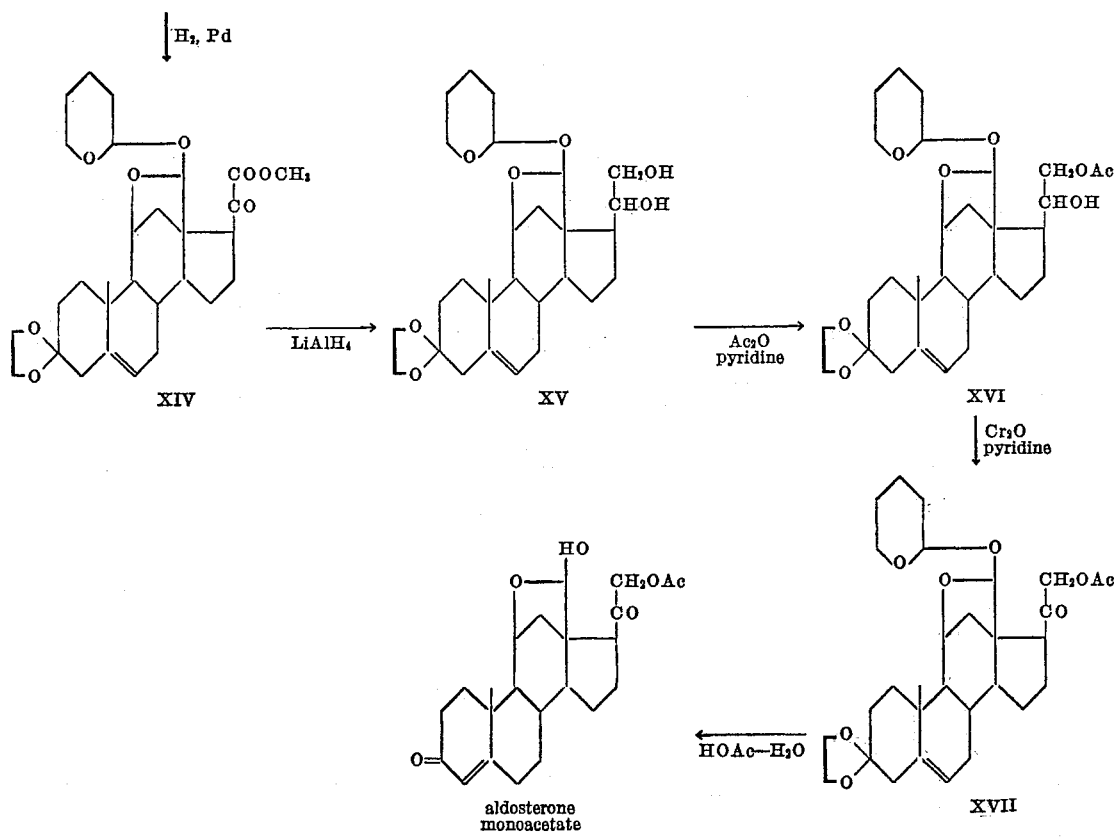

The present invention relates to Part C of the synthesis described above, namely the hydrogenation of the 14:15-double bond and the removal of the 16-oxo group.

According to the present process the 14:15-double bond in a compound of the formula

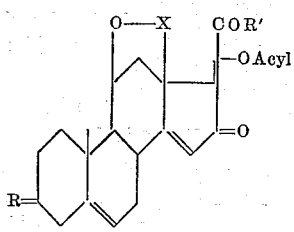

in which R represents a ketalized oxo group; R' represents an alkoxy or preferably a substituted amino group, for example a morpholino group; and X represents the radical

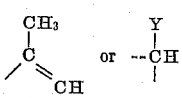

wherein Y is a protected, more especially etherified, hydroxyl group—is catalytically hydrogenated, simultaneously or subsequently the 16-oxo group is reduced to the hydroxyl group which is then removed by treatment with an alkaline agent while simultaneously eliminating the 20-acyl group and forming a $\Delta^{16}$-20-ketone, if desired hydrolyzing a 21-acid derivative to form the free 21-acid and, if desired, esterifying a free 21-acid group.

The catalytic hydrogenation of the 14:15-double bond is advantageously performed in the presence of a noble metal (e.g. palladium) catalyst, for example with palladium on calcium carbonate, barium sulfate, zinc carbonate or on charcoal, in an inert solvent, such as methanol, ethanol, ethyl acetate, dimethyl formamide, tetrahydrofurane or mixtures thereof. The absorption of hydrogen takes place even at room temperature and under atmospheric pressure, but the reaction can be accelerated by working at a higher temperature and under superatmospheric pressure. The double bond in 5:6-position is substantially unaffected when a catalyst, such as a palladium catalyst on one of the afore-mentioned supports is used. On the other hand, hydrogenation generally does not cease when the calculated amount of hydrogen needed to saturate the 14:15-double bond has been absorbed. Surprisingly, the unsaturated grouping that additively combines with hydrogen after saturation of the 14:15-double bond is not the 17:20-enol double bond but the 16-oxo group which can likewise be reduced to the hydroxyl group with the aid of the afore-mentioned catalysts, but in the case of the 21-acid esters this reaction partially affects also the 17:20-enol double bond. The present invention is based on the observation that it is surprisingly possible to prevent this to a large extent by hydrogenating instead of the 21-acid esters the corresponding 21-acid amides in which the 17:20-enol double bond is so strongly inactivated that it can no longer be hydrogenated in the presence of the afore-mentioned palladium catalysts.

Since the hydrogenation of the 16-ozo group proceeds slowly, it is often of advantage to interrupt the catalytic hydrogenation after 1.2 to 1.5 molecular equivalents of hydrogen have been taken up, and to complete the reduction of the 16-oxo group with the aid of a complex metal hydride. This is achieved particularly advantageously with sodium-boron hydride or a sodium-trialkoxy-borohydride e.g. sodium trimethoxy-borohydride using such quantity and solvent as to ensure that the 20-acyloxy group is not hydrolyzed. The reduction with a hydride can be performed in an anhydrous or advantageously in an aqueous medium, for example in pyridine, dioxane, ethylene-glycol dialkylethers or tetrahydrofuran.

Provided the hydrogenation has not been completed, it is possible to isolate the 16:20-dioxopregnane-21-acid amides saturated in 14:15-position, from the crude hydrolysis product after hydrolysis of the 20-acyloxy group.

The conversion of the $\Delta^{17}$-16-hydroxy-20-acetoxy compounds formed by the hydrogenation into $\Delta^{16}$-20-oxo compounds is performed by reaction with an alkaline agent. When a hydroxide or carbonate of an alkali metal (e.g. sodium hydroxide, potassium hydroxide, lithium hydroxide, sodium carbonate, potassium carbonate, etc.) in an inert aqueous medium—for example in aqueous dioxane, tetrahydrofuran or tertiary butanol—is used, the hydrolysis of the 20-acyloxy group and the elimination of the 16-hydroxyl group are accompanied by the hydrolysis of the 12-acid ester or 21-acid amide group respectively, yielding $\Delta^{16}$-20-oxopregnene-21-acids. Alternatively, the 16-hydroxyl and the 20-acyl group can be eliminated, leaving the 21-acid amide group unaffected. This is possible surprisingly easily by treating the $\Delta^{17}$-16-hydroxy-20-acyloxy-21-acid amides with alumina at an elevated temperature in an inert solvent such as benzene, toluene or the like. Alternatively, the enol acetate group can be split off selectively by aminolysis, that is to say, by treatment with an amine, especially the amine contained in the acid amide group. All that is required in this connection is heating the amide-enol acetate with the amine, preferably in the presence of an inert anhydrous or aqueous solvent, such as benzene, toluene, dioxane, tetrahydrofurane, etc. In the $\Delta^{16}$-20-oxo-pregnene-21-acid amides thus obtained the acid amide group can be hydrolyzed as described above in an aqueous medium with the aid of an alkaline agent as mentioned above, either before or after hydrogenation of the 16:17-double bond.

The esterification of the 20-oxo-pregnene-21-acids, which may be saturated or unsaturated in the 16:17-position, is performed by methods as such known. When esterification is effected with diazomethane, the reaction is conducted for a very short time and at a low temperature in order to form the desired 16:17-saturated-20-oxo-pregnane-21-acid ester. Esterification is also possible when an alkali metal salt of the acid is treated with a lower alkyl halide, sulfate, phosphate, etc., such as dimethyl sulfate or methyl iodide. It is especially simple to esterify the acid in an anhydrous medium with a lower alkyl halide, such as methyl iodide, with or without a diluent, in the presence of an excess of anhydrous alkali metal salt of a weak acid, e.g. potassium carbonate.

The present invention further provides compounds of the formulae

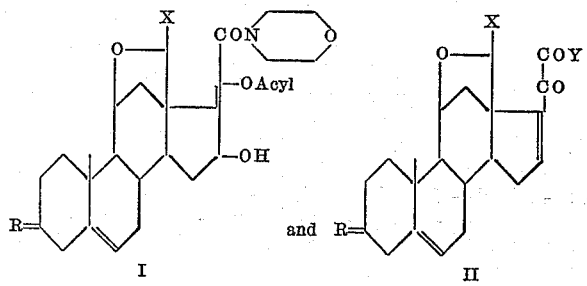

in which R represents a ketalized oxo group, X a protected, more especially an etherified, hydroxyl group, or an acyl radical or a lower aliphatic acyl radical, especially an acetyl radical, and Y represents a substituted amino group, such as a morpholino group or a hydroxyl, alkoxy (for example methoxy) group—as well as the $\Delta^4$-3-ketones obtained by ketal cleavage of the compounds of Type II. These compounds are valuable intermediates for the manufacture of aldosterone or of derivatives thereof.

The compounds of the present invention are racemates or optically active compounds. Racemates can be split in conventional manner into optically active compounds.

The starting materials to be used in the present process, as well as their preparation, have been described in U.S.

patent application Serial No. 776,691, filed concurrently herewith.

The following examples illustrate the invention.

Example 1

500 mg. of d:1-$\Delta^{5:14:17:18}$-3-ethylenedioxy-11$\beta$:18a-oxido - 16 - oxo - 18a - methyl - 20 - acetoxy - 18 - homo-pregnatetraene-21-acid methyl ester are stirred in an atmosphere of hydrogen in 125 cc. of methanol containing 250 mg. of 10% palladium+calcium carbonate catalyst. After about 2 hours the amount of hydrogen calculated for 2 molecular equivalents has been taken up. Hydrogenation is discontinued, the catalyst is filtered off, and the solution is evaporated to dryness in a water-jet vacuum. Crystallization of the residue from methanol+ether yields 109 mg. of d:1-$\Delta^{5:17:18}$-3-ethylenedioxy-11$\beta$:18a-oxido - 16 - hydroxy - 18a - methyl - 20 - acetoxy - 18-homo-14$\beta$-pregnatriene-21-acid methyl ester which melts at 201–203° C. after recrystallization from acetone+ether or from methanol.

Ultraviolet spectrum: Maximum at 228 m$\mu$ ($\epsilon$=11600). Infrared spectrum in methylene chloride: 2.84 $\mu$ (hydroxyl); 5.67 $\mu$ (enol acetate); 5.94 $\mu$ (dihydropyran); 6.05 $\mu$ (enol) and 9.05 $\mu$ to 9.10 $\mu$ (ketal).

According to its ultraviolet spectrum ($\epsilon_{229\ m\mu}$=8300) the mother liquor contains a further quantity of the above 16-hydroxy compound; it is chromatographed over 12 grams of alumina (activity II). The first fractions, elutriated with a total of 180 cc. of benzene, yield by crystallization from ether+hexane 106 mg. of crystals which are further recrystallized from methanol to yield d:1-$\Delta^{5:17:18}$ - 3 - ethylenedioxy - 11$\beta$:18a - oxido - 16 - oxo-18a-methyl-18-homo-14$\beta$-pregnatriene-21-acid methyl ester in yellow crystals melting at 181–185° C.

Ultraviolet spectrum in absolute alcohol: Maximum at 240 m$\mu$ ($\epsilon$=6660). Infrared spectrum in methylene chloride: Between 5.75 $\mu$ and 6.25 $\mu$ bands at 5.78 $\mu$ (with inflexion at 5.85 $\mu$), 5.94 $\mu$, 6.03 $\mu$ and 6.24 $\mu$.

The first of the subsequent fractions, elutriated with 1:1-mixtures of benzene+ethyl acetate, yield another 50 mg. of the 16-hydroxy compound described above, melting at 201–203° C.

Example 2

23.03 grams of d:1-$\Delta^{5:14:17:18}$-3-ethylenedioxy-11$\beta$-18a-oxido - 16 - oxo - 18a - methyl - 20 - acetoxy - 18-homo-pregnatetraene-21-acid morpholide are hydrogenated in 750 cc. of dimethyl formamide containing 7.5 grams of 10% palladium+calcium carbonate catalyst at room temperature. After about 6½ hours the amount of hydrogen calculated for 2 molecular equivalents has been taken up. The catalyst is filtered off, washed on the filter with dimethyl formamide, and the filtrate is evaporated to dryness under 1.5 mm. Hg pressure at 50–60° C. bath temperature. Crystallization of the residue from about 50 cc. of methanol yields 20.44 grams of pure d:1 - $\Delta^{5:17:18}$ - 3 - ethylenedioxy - 11$\beta$:18a - oxido - 16-hydroxy - 18a - methyl - 20 - acetoxy - 18 - homo - 14$\beta$-pregnatriene-21-acid morpholide. A specimen thereof, recrystallized from methanol, melts at 236–238° C. (in vacuo, with decomposition). No absorption maximum above 210 m$\mu$ strong terminal absorption. Infrared spectrum in methylene chloride: 2.93 $\mu$ (hydroxyl); 5.67 $\mu$ (enol acetate); 5.96 $\mu$ (dihydropyran) and 6.15 $\mu$ (amide+enol).

400 mg. of the above $\Delta^{14}$-16-keto-morpholide described above are hydrogenated in 100 cc. of ethyl acetate in the presence of 400 mg. of 10% palladium+calcium carbonate catalyst until the absorption of hydrogen ceases, the reaction mixture is evaporated to dryness and the residue crystallized from methanol: yield: 362 mg. of the 16-hydroxy compound described above, melting at 236–238° C.

80 mg. of the 16-hydroxy compound described above are kept for 2 days in a mixture of 1.0 cc. of pyridine and 1.0 cc. of acetanhydride at room temperature. Usual working up yields 96 mg. of a crude product which is crystallized from acetone and methanol and yields d:1 - $\Delta^{5:17:18}$ - 3 - ethylenedioxy - 11$\beta$:18a - oxido - 16:20-di - acetoxy - 18a - methyl - 18 - homo - 14$\beta$ - pregnatriene-21-acid morpholide melting at 249–251° C. (in vacuo, with decomposition).

No maximum above 210 m$\mu$ in the ultraviolet spectrum. Infrared spectrum in methylene chloride: No hydroxy band; between 5.5$\mu$ and 6.25$\mu$ bands at 5.74$\mu$ (with inflexion at 5.69$\mu$), 5.95$\mu$ and 6.08$\mu$.

Example 3

Hydrogenation of the d:1-$\Delta^{5:14:17:18}$-3-ethylenedioxy-11$\beta$:18a - oxido - 16 - oxo - 18a - methyl - 20 - acetoxy-18-homo-pregnatetraene-21-acid morpholide as described in Example 2, except that it is performed only until 2 molecular equivalents of hydrogen have been taken up, in the presence of a palladium+calcium carbonate catalyst in ethyl acetate, yields a crude product which contains in addition to the 14:15-saturated 16-hydroxy compound also a certain quantity of the corresponding 16-oxo compound. These two compounds cannot be separated from each other by crystallization; however, when the crude product is treated with alumina, the 16-oxo compound is adsorbed much more strongly on the alumina than the $\Delta^{16}$-20-oxo-21-morpholide formed from the 16-hydroxy compound. Conversely, the 16-oxo compound can be isolated from the mixture in the following manner:

100 mg. of the crude hydrogenation product, dissolved in 2.0 cc. of tetrahydrofuran, are heated with 6 cc. of water and 2.0 cc. of N-caustic soda solution under nitrogen for 12 hours at 80° C. Usual working up and breaking down into acidic and neutral constituents yields 54 mg. of acid which, on crystallization from methanol, yields 14 mg. of d:1-$\Delta^{5:18}$-3-ethylenedioxy-11$\beta$:18a-oxido-16:20 - dioxo - 18a - methyl - 18 - homo - 14$\beta$ - pregnadiene-21-acid morpholide. After recrystallization from methanol-ether it melts at 181–183° C. (with decomposition).

Ultraviolet spectrum: Neutral—maximum at 280 m$\mu$ ($\epsilon$=6700). Alkaline—maximum at 312 m$\mu$ ($\epsilon$=9900).

Example 4

A solution of 25.41 grams of d:1-$\Delta^{5:17:18}$-3-ethylenedioxy - 11$\beta$:18a - oxido - 16- hydroxy - 18a - methyl-20-acetoxy-18-homo-14$\beta$-pregnatriene-21-acid morpholide are stirred under reflux for 6 hours in 2.5 liters of benzene with 125 grams of alkaline alumina. The mixture is cooled, the alumina is suctioned off and washed on the filter with chloroform, 1:1-mixture of chloroform and methanol and with methanol, and the filtrate is evaporated to dryness in a water-jet vacuum. When a small quantity of ether is added to the residue, it crystallizes almost completely. Crystallization from methylene chloride+ methanol yields 20.62 grams of pure d:1-$\Delta^{5:16:18}$-3-ethylene - dioxy - 11$\beta$:18a - oxido - 18a - methyl - 20 - oxo-18-homo-14$\beta$-pregnatriene-21-acid morpholide melting at 203–207° C. A specimen recrystallized from methanol melts at 208–210° C. (in vacuo). Ultraviolet spectrum: Maximum at 249 m$\mu$ ($\epsilon$=7400). Infrared spectrum in methylene chloride: Between 5.75$\mu$ and 6.50$\mu$ bands at 5.99$\mu$, 6.07$\mu$ and 6.26$\mu$.

When 16-hydroxy morpholide obtained by hydrogenation in ethyl acetate is treated with alumina in the manner described above, a crude product is obtained which yields by chromatography over alumina, in addition to the $\Delta^{16}$-20-ketone elutriated with benzene and with a 1:1-mixture of benzene and ether, a small amount of a compound which can be elutriated with ethyl acetate and which melts at 225–227° C. after recrystallization from acetone+ether and from methanol. The substance, which crystallizes in the form of fine needles, is probably the d:1 - $\Delta^{5:18}$ - 3 - ethylenedioxy - 11$\beta$:18a - oxido - 16 - oxo-18a - methyl - 18 - homo - 14$\beta$ - pregnadiene - 21 - acid morpholide.

5.00 grams of crude d:l-$\Delta^{5:16:18}$-3-ethylenedioxy-11β: 18a - oxido - 18a - methyl - 20 - oxo - 18 homo - 14-pregnatriene-21-acid morpholide are dissolved in 100 cc. of glacial acetic acid, 50 cc. of water are added, and the whole is kept under nitrogen for 30 minutes at 100° C., then allowed to cool, poured into 200 cc. of ice water, and repeatedly extracted with methylene chloride. The extracts are washed with sodium bicarbonate solution until neutral, dried and evaporated. Crystallization of the residue from methanol+ether yields 3.72 grams of d:l-$\Delta^{4:16:18}$ - 3:20 - dioxo - 11β:18a - oxido - 18a - methyl-18-homopregnatriene-21-acid morpholide. A specimen thereof, recrystallized from benzene+ether, melts at 193–197° C. (with decomposition). The crystals contain 1 molecular proportion of water of crystallization.

Infrared spectrum in methylene chloride: Between 5.75µ and 6.50µ bands at 5.99µ, 607µ (both strong) and 6.27µ.

*Example 5*

A solution of 1.623 grams of d:l-$\Delta^{5:16:18}$-3-ethylenedioxy - 11β:18a - oxido - 18a - methyl - 20 - oxo - 18-homo-14β-pregnatriene-21-acid morpholide in 200 cc. of ethyl acetate is hydrogenated at room temperature with the aid of 400 mg. of 10% palladium+calcium carbonate catalyst. After 1 hour the amount of hydrogen calculated for 1 molecular equivalent has been taken up, and the hydrogenation comes to a standstill. The catalyst is filtered off, washed on the filter with ethyl acetate, and the filtrate is evaporated to dryness in a water-jet vacuum. Crystallization of the residue from methanol yields a first fraction of 1.104 grams of hydrogenation product melting at 142–145° C.; it contains the two 17-epimeric d:l - $\Delta^{5:18}$ - 3 - ethylenedioxy - 11β:18a - oxido - 18a-methyl - 20 - oxo - 18 - homo - 14β - pregnadiene - 21-acid morpholides. The mother liquor of the foregoing crystallization is evaporated to dryness and chromatographed over 15 grams of alumina (activity II). From the fractions elutriated with 1:1-mixture of benzene+hexane and with benzene another 227 mg. of the aforesaid mixture of epimers can be isolated by crystallization from methanol. In this case separation can likewise not be achieved, though some fractions have melting points of up to 183–186° C.

Ultraviolet spectrum: No maximum above 210 mµ. Infrared spectrum in methylene chloride: 5.85µ (20-ketone; 5.96µ (dihydropyran) and 6.08µ (amide).

A solution of 1.50 grams of d:l-$\Delta^{5:18}$-3-ethylenedioxy-11β:18a-oxido-18a-methyl - 20 - oxo - 18 - homo–14β-pregnadiene-21-acid morpholide in 30 cc. of glacial acetic acid is mixed with 15 cc. of water, and the whole is heated for 30 minutes at 100° C. under nitrogen, then poured into ice water, extracted with methylene chloride, and the extracts are repeatedly washed with water. The methylene chloride solutions are dried and evaporated and the residue (1.46 grams) is triturated with ether, yielding 1.07 grams of d:l-$\Delta^{4:18}$-3:20-dioxo-11β:18a-oxido-18a-methyl-18-homo-14β-pregnadiene-21-acid morpholide. A specimen crystallized from acetone/ether melts at 139–141° C.

Ultraviolet spectrum: Maximum at 240 mµ

(ε=16500)

Infrared spectrum in methylene chloride: 5.86µ (20-ketone); 5.98µ (3-ketone+dihydropyran) and 6.09µ (amide+$\Delta^4$).

40 cc. of water and 80 cc. of N-caustic soda solution are added to a solution of 8.41 grams of d:l-$\Delta^{5:18}$-3-ethylenedioxy-11β:18a-oxido-18a-methyl - 20 - oxo - 18-homo-14β-pregnadiene-21-acid morpholide in 100 cc. of dioxane, and the mixture is heated for 12 hours at 60° C. under nitrogen, then allowed to cool, diluted with water and repeatedly extracted with a 1:1-mixture of benzene and ether. The extracts are washed with water, evaporated to dryness, and yield 215 mg. of a crystalline neutral compound. The combined aqueous solutions are treated with 50 grams of crystalline sodium sulfate and 20 grams of potassium dihydrogen phosphate and extracted once with a 3:1-mixture of chloroform and alcohol and then three times with chloroform, the emulsions thus obtained being broken up by suction-filtration through glass frits. The organic extracts yield a total of 7.51 grams of an acidic constituent which is crystallized from aqueous methanol and yields 4.83 grams of crystalline d:l-$\Delta^{5:18}$ - 3 - ethylenedioxide - 11β:18a - oxido-18a-methyl-20-oxo-18-homo-14β-pregnadiene-21-acid. From aqueous methanol the product is obtained in fine needles containing one molecular proportion of water of crystallization, melting at 128–133° C. (with decomposition).

Infrared spectrum in methylene chloride: 2.69µ+6.21µ (water); 2.92µ (hydroxyl); 5.61µ+5.82µ (keto-acid) and 5.95µ (dihydropyran).

*Example 6*

A solution of 1.55 grams of crude d:l-$\Delta^{5:18}$-3-ethylenedioxy-11β:18a-oxido-18a-methyl - 20 - oxo - 18 - homo-14β-pregnadiene-21-acid (obtained from 1.63 grams of crystalline morpholide as described above) in a mixture of 15 cc. of methanol and 60 cc. of ether is cooled to 0° C., mixed with ethereal diazomethane solution, and after 10 minutes the excess of the methylating agent is destroyed by adding a small amount of glacial acetic acid. The whole is then diluted with ether, washed with dilute sodium bicarbonate solution and with water, and the ethereal solution is then dried and evaporated. Crystallization of the residue (1.58 grams) from methanol yields 990 mg. of d:l - $\Delta^{5:18}$ - 3 - ethylenedioxy - 11β:18a-oxido-18a-methyl - 20 - oxo - 18 - homo-14β-pregnadiene-21-acid methyl ester melting at 157–160° C.

Infrared spectrum in methylene chloride: 5.74µ (ester); 5.79µ (20-ketone); 5.95µ (dihydropyran) and 9.10µ (ketal).

The mother liquor is evaporated to dryness and the residue (520 mg.) dissolved in 1:1-benzene+hexane and chromatographed over 15 grams of alumina (activity II). The first fraction (100 cc. of 1:1-benzene+hexane) yields another 80 mg. of the aforementioned ester. In the following fractions, elutriated with the same mixture and with pure benzene, yield on crystallization from ether 45 mg. of d:l-$\Delta^{5:18}$-3-ethylenedioxy-11β:18a; 20÷22-bis-oxido-18a-methyl - 18 - homo - 14 - bis-norcholadiene-21-acid methyl ester melting at 197–200° C.

Infrared spectrum in methylene chloride: 5.72µ (ester); 5.96µ (dihydropyran) and 9.10µ (ketal).

The 20-oxo-21-acid methyl ester described above can alternatively be prepared from the crystalline keto-acid in the following manner: 223 mg. of the acid are dissolved in 5.0 cc. of 0.1 N-methanolic potassium hydroxide solution. The solution is evaporated to dryness in a water-jet vacuum and dehydrated by evaporation with benzene. The resulting amorphous potassium salt is dissolved in 7.0 cc. of absolute benzene. 0.2 cc. of dimethyl sulfate is then added, the whole is stirred overnight at room temperature, diluted with benzene and washed with dilute sodium bicarbonate solution and with water, and extracted with a 1:1-mixture of benzene and ether. The organic solutions are combined, dried and evaporated. Crystallization of the residue from ether+hexane yields 127 mg. of d:l-$\Delta^{5:18}$-3-ethylenedioxy-11β:18a - oxido - 18a - methyl - 20 - oxo-18-homo-14β-pregnadiene-21-acid methyl ester which on being once more recrystallized from ether melts at 157.5–160° C.

A solution of 400 mg. of d:l-$\Delta^{5:18}$-3-ethylenedioxy-11β:18a-oxido-18a-methyl-20-oxo-18-homo - 14β-pregnadiene-21-acid methyl ester in 8 cc. of glacial acetic acid and 4 cc. of water is heated for 30 minutes at 100° C. The mixture is then poured into 50 cc. of ice water and repeatedly extracted with ether. The extracts are washed until neutral and yield 322 mg. of a crystalline residue.

On re-crystallization from methanol pure d:l-$\Delta^{4:18}$-3:20-dioxo-11β:18a-oxido-18a-methyl - 18 - homo-14-pregnadiene-21-acid methyl ester melts at 182–185° C.

Ultraviolet absorption maximum at 239mμ (ε=17700). Infrared spectrum in methylene chloride: 5.75μ (ester); 5.80μ (20-ketone); 5.98μ (3-ketone+dihydropyran) and 6.17μ ($\Delta^4$).

Example 7

1.02 grams of osmium tetroxide in 40 cc. of absolute ether is slowly stirred dropwise into a solution of 2.00 grams of d:l-$\Delta^{5:18}$-3-ethylenedioxy - 11β:18a - oxido-18a-methyl-20-oxo-18-homo-14β-pregnadiene - 21 - acid morpholide in 40 cc. of ice-cold tetrahydrofuran. The temperature of the reaction mixture is then allowed to rise gradually to 25° C., and the mixture is stirred on for a total of 21 hours, diluted with 240 cc. of tetrahydrofuran, a solution of 10 grams of ammonium sulfite in 240 cc. of water is added, and the mixture is stirred for 2 hours at room temperature, during which the top layer becomes completely colorless in a short time. The mixture is then suction filtered through a glass frit, washed on the filter with tetrahydrofuran, and the low-boiling solvent is removed as far as possible in a water-jet vacuum. The crystalline precipitate obtained in this manner is suctioned off and washed with water. Yield: 1.965 grams of d:l-$\Delta^5$-3-ethylenedioxy-11β:18a-oxido-18:18a-dihydroxy-18a-methyl-20-oxo-18-homo-14β - pregnene-21-acid morpholide melting at 171–179° C. On crystallization from methylene chloride the compound melts at 166–168° C.

679 mg. of the crude 18:18a-glycol described above are dissolved in 13 cc. of dioxane, 0.22 cc. of pyridine and 2.2 cc. of a 1-molar solution of meta-periodic acid are added, and the mixture is stirred for 8 hours at room temperature, then diluted with methylene chloride, repeatedly washed with water, and the aqueous solutions are extracted once with methylene chloride. The crude product (580 mg.) obtained from the methylene chloride extracts is chromatographed over 15 grams of alumina (activity II). The fractions elutriated with ethyl acetate are crystallized from ether and yield d:l-$\Delta^5$-3-ethylenedioxy-11β-acetoxy-18:20-dioxo-14β-pregnene-21-acid morpholide melting at 236–237.5° C. (with decomposition).

Infrared spectrum in methylene chloride: Between 5.5μ and 6.25μ bands at 5.75μ, 5.85μ with inflexion at 5.88μ and 6.08μ.

Example 8

100 mg. of d:l$\Delta^{5:14:17}$-3-ethylenedioxy-11β:18-oxido-16 - oxo - 18 - tetrahydropyranyloxy-20-acetoxy-pregnatriene-21-acid methyl ester in 25.0 cc. of ethyl acetate are hydrogenated in the presence of 100 mg. of 10% palladium+calcium carbonate catalyst. After about 2 molecular equivalents of hydrogen have been taken up, the hydrogenation is discontinued (8 hours) and the catalyst is filtered off. The filtrate is evaporated and the residue crystallized from methylene chloride+ether to yield 30 mg. of d:l-$\Delta^{5:17}$-3-ethylenedioxy-11β:18-oxido-16-oxo-18 - tetrahydropyranyloxy - 20 - acetoxy-pregnadiene-21-acid methyl ester which melts at 234–237° C. after another recrystallization. Ultraviolet spectrum: Maximum at 260 mμ (ε=7200).

Reduction with sodium-boron hydride as described in Example 10 yields the corresponding 16-hydroxy compound whose hydrolysis as described in Example 11 produces $\Delta^{16}$-20-oxo-21-acid.

Example 9

64 mg. of d:l-$\Delta^{5:14:17(20)}$-3-ethylenedioxy-11β:18-oxido-16 - oxo - 18 - tetrahydropyranyloxy - 20 - acetoxy-pregnatriene-21-acid morpholide are dissolved in 25 cc. of ethyl acetate, 100 mg. of 10% palladium+carbon catalyst are added, and the mixture is stirred for 10 hours under hydrogen at 23–26° C. under 743 mm. Hg pressure. About 10.7 cc. of hydrogen are taken up (of which about 5 cc. is absorbed by the catalyst and the solvent). The whole is suction filtered, the catalyst is thoroughly washed on the filter with methylene chloride, and the filtrate is evaporated in vacuo to dryness. The residue (68 mg.)—which crystallizes on being moistened with ether—displays a strong absorption maximum at 221 mμ (ε=10800). Pure d:l-$\Delta^{5:17(20)}$-ethylenedioxy-11β:18-oxido - 16 - hydroxy - 18-tetrahydropyranyloxy-20-acetoxy-pregnadiene-21-acid morpholide crystallizes from ether in small needles melting at 222–225° C.

Ultraviolet spectrum: Maximum at 221 mμ

(ε=11900)

Infrared spectrum in methylene chloride: 2.94μ (hydroxyl): 5.66μ (enol acetate) and 6.15μ (amide+enol).

Example 10

2.00 grams of d:l-$\Delta^{5:14:17(20)}$-3-ethylenedioxy-11β:18-oxido - 16 - oxo - 18 - tetrahydropyranyloxy-20-acetoxy-pregnatriene-21-acid morpholide are suspended in 400 cc. of ethyl acetate, 3.5 grams of 10% palladium+calcium carbonate catalyst are added, and the whole is stirred for 30 hours at 25° C. under 7.38 mm. Hg pressure in a current of hydrogen, then worked up as described in Example 9. As can be inferred from its absorption band at 5.81μ, the crude product still contains some unreacted 16-ketone. Crystallization from ether yield 1.094 grams of crystalline mixture melting at 197–214° C.

100 mg. of this mixture of 16-oxo- and 16-hydroxy compound are once more hydrogenated in 25 cc. of ethyl acetate in the presence of 100 mg. of 10% palladium +carbon catalyst until less than 0.1 cc. of hydrogen per hour is being taken up. The crude product obtained in the usual manner is crystallized from ether and yields 75 mg. of the pure d:l-$\Delta^{5:17(20)}$-3-ethylenedioxy-11β18-oxido-16-hydroxy-18-tetrahydropyranyloxy - 20 - acetoxy-pregnadiene-21-acid morpholide, melting at 222–225° C., described in Example 9.

The 16-ketone component of the above crystalline mixture can also be reduced in the following manner:

430 mg. of the above crystalline mixture melting at 197–214° C. are dissolved in 17.2 cc. of tetrahydrofuran; 0.172 cc. of a freshly prepared solution of 115 mg. of sodium-boron hydride in 2.00 cc. of water are added, and the solution is kept for 3 hours at 20–25° C., then acidified with 0.3 cc. of a mixture of 4.5 cc. of water and 0.5 cc. of glacial acetic acid, and extracted several times with methylene chloride. The extracts are twice washed with water, combined, dried, evaporated in a water-jet vacuum, and the residue is crystallized from ether. Yield: 308 mg. of pure d:l-$\Delta^{5:17(20)}$-3-ethylenedioxy - 11β:18 - oxido - 16 - hydroxy - 18 - tetrahydropyranyloxy-20-acetoxy-pregnadiene-21-acid morpholide melting at 222–225° C.

The same product is obtained by subjecting to a completely analogous reduction with sodium-boron hydride a hydrogenation product melting at 192–204° C. which, according to its infrared spectrum and ultraviolet absorption maximum (ε$_{270\ m\mu}$=5800), consists of almost pure d:l-$\Delta^{5:17(20)}$-3-ethylenedioxy-11β:18 - oxido-16-oxo-18-tetrahydropyranyloxy - 20 - acetoxy-pregnadiene-21-acid morpholide.

Example 11

500 mg. of the d:l-$\Delta^{5:17(20)}$-3-ethylenedioxy-11β:18-oxido - 16 - hydroxy - 18 - tetrahydropyranyloxy - 20-acetoxy-pregnadiene-21-acid morpholide described in Example 9 are dissolved in 15 cc. of dioxane; 10.0 cc. of N-caustic soda solution and 5.0 cc. of water are added, and the whole is heated in a sealed tube for 12 hours at 80° C., then diluted with 100 cc. of water. The alkaline solution is extracted with ether, and while being cooled with ice and stirred it is acidified with 11.75 cc. of N-hydrochloric acid and immediately afterwards repeatedly extracted with methylene chloride. The methylene chloride extracts are washed with saturated common salt solution, combined, dried and evaporated to dryness in a water-jet vacuum, to yield 470 mg. of the $\alpha:\beta$-unsaturated keto acid as a pale-yellow foam.

The above foam is dissolved in 10 cc. of methyl iodide, 1.0 gram of powdered, calcined potassium carbonate are added, and the mixture is refluxed for 12 hours with exclusion of water, then diluted with benzene. The solution which is rendered turbid by potassium iodide is decanted from the solid potassium carbonate and thoroughly washed with benzene. The organic solution is washed with water containing some bicarbonate and then with dilute common salt solution, dried and evaporated in a water-jet vacuum. The residue (370 mg) displays a distinct absorption maximum ($\epsilon$=5050) at 251 m$\mu$. Crystallization from methanol yields a first crystallizate of 167 mg. of d:l-$\Delta^{5:16}$-3-ethylenedioxy-11$\beta$:18-oxido - 18 - tetrahydropyranyloxy - 20-oxo-pregnadiene-21-acid methyl ester melting at 182–185° C. Ultraviolet spectrum:

Maximum at 252 m$\mu$ ($\epsilon$=6200). Infrared spectrum in methylene chloride: 5.74$\mu$ (ester); 5.94$\mu$+6.30$\mu$ ($\Delta^{16}$-20-ketone) and 9.19$\mu$ (ketal).

Example 12

100 mg. of crude hydrogenation product (prepared as described in Example 10)—which contains apart from the 16-hydroxy compound about 30–40% of the 16-keto compound—are dissolved in 20 cc. of absolute benzene and stirred for 4 hours with 2.0 grams of basic alumina (activity II) under nitrogen and with exclusion of water at 80° C. bath temperature. The mixture is allowed to cool, then suction filtered, the filter residue is repeatedly washed with benzene, and the filtrate is evaporated to dryness in a water-jet vacuum. The residue (34 mg.) is recrystallized from ether to yield the d:l-$\Delta^{5:16}$-3-ethylenedioxy-11$\beta$:18-oxido - 18 - tetrahydropyranyloxy-20-oxo-pregnadiene-21-acid morpholide melting at 182–185° C.

Ultraviolet spectrum: Maximum at 250 m$\mu$ ($\epsilon$=7600). Infrared spectrum in methylene chloride: 5.96$\mu$ (20-ketone); 6.06$\mu$ (amide); 6.28$\mu$ ($\Delta^{16}$) and 9.16$\mu$ (ketal).

Hydrolysis and esterification as described in Example 11 gives a good yield of the corresponding 21-acid methyl ester melting at 182–185° C.

Example 13

100 mg. of crystalline crude hydrogenation product (prepared as described in Example 10)—which contains apart from the 16-hydroxy compound 30–40% of the 16-oxo-compound—are dissolved in 2.5 cc. of dioxane, 2.5 cc. of aqueous ammonium hydroxide of 30% strength are added, and the mixture is kept overnight at room temperature, then evaporated to dryness in a water-jet vacuum. The residue is taken up in methylene chloride and repeatedly extracted with dilute sodium bicarbonate solution. The alkyline extracts are acidified with dilute phosphoric acid and extracted with methylene chloride, yielding 47 mg. of acidic constituents; on recrystallization from aqueous methanol they yield d:l-$\Delta^5$-3-ethylenedioxy - 11$\beta$:18 - oxido - 16:20 - dioxo - 18 - tetrahydropyranyloxy-pregnene-21-acid morpholide in crystals containing water of crystallization, melting at 213–214° C. (with decomposition). The compound gives a claret coloration with methanolic ferric chloride solution and displays in a neutral solution an absorption maximum at 290 m$\mu$ ($\epsilon$=7200) and in alkaline solution an absorption maximum at 310 m$\mu$ ($\epsilon$=12800).

Infrared spectrum in methylene chloride: Between 5.75$\mu$ and 6.25$\mu$ bands at 5.94$\mu$ and 6.12$\mu$.

Example 14

1.5 g. of d:l-$\Delta^{5:17:18}$-3-ethylenedioxy-11$\beta$:18a-oxido-18a - methyl - 16 - hydroxy - 20 - acetoxy - 18 - homo- 14$\beta$-pregnatriene-21-acid-morpholide are dissolved in 50 cc. of dioxane. After the addition of 20 cc. of water and 30 cc. of N-caustic soda solution the reaction mass is stirred overnight in an atmosphere of nitrogen at room temperature. The mixture is then diluted with 120 cc. of water, extracted twice with 150 cc. of a 1:2 mixture of benzene and ether each time, and the extracts washed with 75 cc. of water. From the organic solutions there is obtained a total of 85 mg. of a crystalline neutral product. Beneath the combined aqueous solutions a layer is introduced of 200 cc. of methylene chloride and, while stirring, the pH is adjusted to about 4 with N-hydrochloric acid. There follow separation, several extractons with methylene chloride, and washing of the extracts with semisaturated sodium chloride solution. The methylene chloride solutions are combined and dried. On evaporation, they leave behind 1.390 g. of crude acid (absorption maximum at 247 m$\mu$=4500). This acid is dissolved in 15 cc. of methyliodide and, after the addition of 2.6 g. of freshly calcined potassium carbonate, refluxed and stirred for 12 hours at 60° C. while excluding moisture. The reaction mass is then diluted with 50 cc. of methylene chloride, decanted to separate the salt residue which is then washed with methylene chloride. The organic solution, which is turbid on account of the potassium carbonate and potassium iodide it contains, is washed with water, dried and evaporated under a vacuum produced by a water jet pump. There remain behind 861 mg. of a neutral product. On crystallization from ether and methanol there is obtained the pure d:l-$\Delta^{5:16:18}$-3-ethylenedioxy - 11$\beta$:18a - oxido - 18a - methyl - 20 - oxo-18-homo-14$\beta$-pregnatriene-21-acid methyl ester in the form of spears of melting point 176–178° C. UV spectrum: maximum at 253 m$\mu$ ($\epsilon$=6800). IR spectrum: bands at 5.74$\mu$ (ester); 5.96$\mu$ (unsaturated ketone+dihydropyran); 6.28$\mu$ ($\Delta^{16}$) and 9.10$\mu$ (ketal).

Example 15

539 mg. of the d:l-$\Delta^{5:16:18}$-3-ethylenedioxy-11$\beta$: 18a-oxido - 18a - methyl - 20 - oxo - homo - 14$\beta$ - pregnatriene-21-acid morpholide described in Example 4 are allowed to stand at room temperature for 48 hours with 15 cc. of dioxane, 6 cc. of water, and 2.0 cc. of N-caustic soda solution in an evacuated vessel. The mixture is then diluted with 75 cc. of water and extracted twice with 80 cc. of a 3:1 mixture of ether and benzene each time. From the extracts there are obtained 20 mg. of a neutral product. The aqueous solution is mixed with 500 mg. of sodium acetate and beneath the mixture a layer is introduced consisting of 50 cc. of methylene chloride. The whole is stirred while being weakly acidified by the dropwise addition of N-hydrochloric acid, and extracted several times with methylene chloride. There are obtained 420 mg. of the crude $\Delta^{5:16:18}$-3-ethylenedioxy - 11$\beta$:18a - oxido - 18a - methyl - 20 - oxo - 18-homo-14$\beta$-pregnatriene-21-acid (absorption maximum at 247 m$\mu$=4000), which is esterified as described in Example 14.

In an entirely analogous manner there is obtained the corresponding 21-acid from the d:l-$\Delta^{5:16}$-3-ethylenedioxy-11$\beta$:18 - oxido - 18 - tetrahydropyranyloxy - 20 - oxo-pregnadiene-21-acid morpholide described in Example 12.

Example 16

200 mg. of the d:l-$\Delta^{5:17:18}$-3-ethylenedioxy-11$\beta$:18a-oxido - 16 - hydroxy - 18a - methyl - 20 - acetoxy - 18-homo-14$\beta$-pregnatriene-21-acid morpholide described in Example 2 are dissolved in 5 cc. of tetrahydrofurane and 0.5 cc. of water and, after the addition of 0.5 cc. of morpholine, refluxed for 3 hours at a bath temperature of 80° C. The reaction mass is then diluted with methylene chloride and washed several times with water. The methylene chloride solution is dried and the residue (182 mg.; UV absorption at 245 m$\mu$: $\epsilon$=4500) crystallized from ether to obtain 110 mg. of the pure d:l-$\Delta^{5:16:18}$-3-ethylenedioxy - 11$\beta$:18a - oxido - 18a - methyl - 20 - oxo- 18-homo-14β-pregnatriene-21-acid morpholide of melting point 208–210° C. which is identical with the compound described in Example 4.

Example 17

25 mg. of the d:l-Δ$^{5:17(20)}$-3-ethylenedioxy-11β:18-oxido - 16 - hydroxy - 18 - tetrahydropyranyloxy - 20-acetoxy-pregnadiene-21-acid morpholide described in Example 10 are dissolved in 0.5 cc. of absolute toluene and, after the addition of 0.05 cc. of morpholine, heated at 110° C. for 4 hours. The reaction mass is then evaporated to dryness under a vacuum produced by a water jet pump. The residue shows a distinct absorption maximum at 247 mμ (ε=3300) and contains about 50% of the d:l - Δ$^{5:16}$ - 3 - ethylenedioxy - 11β:18a - oxido - 18-tetrahydropyranyloxy - 20 - oxo - pregnadiene - 21 - acid morpholide of melting point 182–185° C. which is described in Example 12.

Example 18

10.00 g. of crystalline d:l-Δ$^{5:14:17(20)}$-3-ethylenedioxy-11β:18 - oxido - 16 - oxo - 18 - tetrahydropyranyloxy - 20-acetoxy-pregnatriene-21-acid morpholide are dissolved in 100 cc. of methylene chloride and evaporated to dryness under reduced pressure. The oily residue is taken up in 300 cc. of freshly distilled dimethylformamide which has been prehydrogenated with the use of 10% palladium calcium carbonate catalyst. 1.5 g. of 10% palladium carbon catalyst are added and the whole agitated in an atmosphere of hydrogen. After 3 hours, the quantity of gas calculated for 2 molecular equivalents is absorbed. The hydrogenation is stopped, the catalyst separated by filtration, and the solution evaporated to dryness under a pressure of 0.1 mm. of mercury. By crystallizing the residue from a mixture of ether and hexane there are obtained in two fractions a total of 7.26 g. of d:l-Δ$^{5:17(20)}$-3-ethylenedioxy - 11β:18 - oxido - 16 - hydroxy-18-tetrahydropyranyloxy - 20 - acetoxy - pregnadiene - 21-acid morpholide of melting point 222–225° C.

250 mg. of this compound are dissolved in 5 cc. of dioxane. 1.15 cc. of water and 1.35 cc. of 1 N-caustic potash solution are added, the reaction vessel is evacuated by means of a water jet pump, and the reaction mass allowed to stand at 20–25° C. for 24 hours. After that, carbon dioxide is passed through the solution for 2 hours while stirring vigorously, which operation is following by evaporation to dryness under a vacuum produced by a water jet pump. The residue is dried by being taken up in benzene and evaporated once more. There are then added to 10 cc. of absolute tertiary butanol, 200 mg. of freshly calcined potassium carbonate and 2.0 cc. of methyl iodide, and the whole is stirred with exclusion of moisture for 12 hours in a bath of 60° C.

The reaction mass is then diluted with methylene chloride and washed several times with ice water, the aqueous solutions being extracted again with methylene chloride. The methylene chloride solutions are combined and dried. They yield 203 mg. of a neutral product from which by crystallization from methanol a total of 140 mg. of the d:l-Δ$^{5:16}$-3-ethylenedioxy-11β:18-oxido-18-tetrahydropyranyloxy-20 - oxo - pregnadiene-21 - acid methyl ester of melting point 182–185° C. is obtained. This product is identical with the compound described in Example 11.

80 mg. of this ester are dissolved in 3 cc. of glacial acid while heating and, after the addition of 0.3 cc. of water, placed for 5 minutes in an oil bath having a temperature of 100° C. The reaction mass is then poured into water and extracted several times with methylene chloride. The extracts are washed with sodium bicarbonate solution and water, combined, dried and evaporated. From the residue (65 mg.) is obtained by crystallization from a mixture of acetone and ether the 11:18-cyclosemiacetal of d:l-Δ$^{4:16}$-3:18:20-trioxo-11β-hydroxy-pregnadiene - 21 - acid - methyl ester of melting point 195–198° C. UV spectrum: maximum at 241 mμ (ε=19100). IR spectrum in CH$_2$Cl$_2$: bands at 2.72μ and 2.85μ (hydroxyl); 5.72μ (ester); 5.97μ (3-ketone and 20-ketone) 6.17μ(Δ$^4$) and 6.28μ(Δ$^{16}$).

Example 19

167 mg. of d:l-Δ$^{5:16}$-3-ethylenedioxy-11β:18-oxido-18-tetrahydropyranyloxy - 20 - oxo - pregndiene - 21 - acid methyl ester are dissolved in 35 cc. of freshly distilled ethyl acetate, 85 mg. of a palladium-calcium carbonate catalyst of 10% strength are added, and the whole is then stirred in an atmosphere of hydrogen until the absorption of gas can no longer be observed (about 1 hour). The catalyst is then filtered off with suction, washed with methylene chloride, and the filtrate is evaporated to dryness under a water jet vacuum. By crystallizing the residue from methylene chloride-ether 93 mg. of pure d:l-Δ$^5$-3-ethylenedioxy-11β:18-oxido-18-tetrahydropyranyloxy-20-oxo-pregene-21-acid methyl ester are obtained, which melts at 220–223° C., and exhibits in the infrared absorption spectrum in methylene chloride bands at 5.70μ, (ester) and 5.97μ (20-ketone).

80 mg. of this α-keto ester of melting point 220–223° C. are dissolved in 3 cc. of glacial acetic acid and heated to 100° C., 0.3 cc. of water is then added and after 5 minutes the solution is poured into 30 cc. of water. The clear solution is extracted several times with methylene chloride and the extracts washed with sodium bicarbonate solution and with water. The residue obtained from the combined and dried extracts (67 mg.) is recrystallized from a mixture of methylene chloride and ether. There is obtained the 11:18-cyclosemiacetal of d:l-Δ$^4$-3:18:20-trioxo-11β-hydroxy - pregnene - 21 - acid-methyl ester in the form of colorless crystals of melting point 191–194° C. UV spectrum: maximum at 240 mμ, (ε=14800); IR spectrum in CH$_2$Cl$_2$: bands at 281μ (OH); 5.72μ (ester+2—CO): 5.97μ and 6.16μ (Δ$^4$-3-ketone).

What is claimed is:

1. Process for the manufacture of 20-oxo-pregnane-21-acids, wherein in a compound of the formula

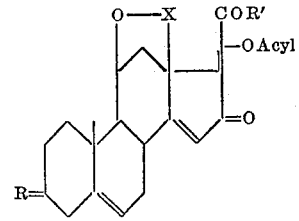

in which R represents a ketalized oxo group, R' represents a member selected from the group consisting of a lower alkoxy group and a substituted amino group, Acyl is a lower aliphatic acyl radical and X represents a member selected from the group consisting of the radical

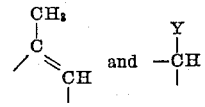

Y being a protected hydroxyl group, is catalytically hydrogenated, using a nobel metal catalyst, until at least about one molar equivalent of hydrogen is taken up.

2. Process according to claim 1, wherein a Δ$^{5:14:17:18}$-3-ethylenedioxy-11β:18a-oxido-16-oxo - 18a - methyl - 18-homo-20-acetoxy-pregnatetraene - 21 - acid morpholide is used as starting material.

3. Process according to claim 1, wherein a Δ$^{5:14:17}$-3-ethylenedioxy - 11β:18 - oxido - 16 - oxo - 18 - tetrahydropyranyl - oxy - 20 - acetoxy - pregnatriene - 21 - acid morpholide is used as starting material.

4. Process according to claim 1, wherein the 14:15-double bond and the 16-oxo group are reduced by catalytic hydrogenation in the presence of a palladium catalyst.

5. Process according to claim 1, wherein the 16-oxo group is subsequently reduced with sodium borohydride.

6. Process accordinging to claim 1, wherein a resulting $\Delta^{17}$ - 16 - hydroxy - 20 - acetoxy - pregnene - 21 - acid morpholide is treated with alumina and the $\Delta^{16}$-20-oxo-pregnene-21-acid morpholide formed is isolated.

7. Process according to claim 1, wherein a resulting $\Delta^{17}$ - 16 - hydroxy - 20 - acetoxy - pregnene - 21 - acid morpholide is treated with an alkali metal hydroxide in an aqueous medium, and the $\Delta^{16}$-20-oxo-pregnene-21-acid formed is isolated.

8. Compounds of the formula

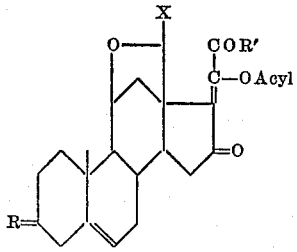

wherein R represents a ketalized oxo group, R' a member selected from the group consisting of a lower alkoxy group and a morpholino group, X a tetrahydropyranyloxy group, and "Acyl" a lower aliphatic acyl radical.

9. $\Delta^{5\cdot17}$ - 3 - ethylenedioxy - 11$\beta$:18 - oxido - 16 - oxo-18 - tetrahydropyranyloxy - 20 - acetoxy - pregnadiene-21-acid morpholide.

10. Compounds of the formula

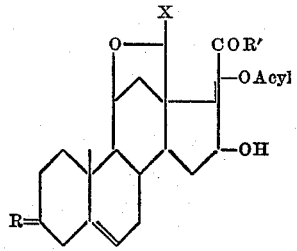

wherein R represents a ketalized oxo group, R' a member selected from the group consisting of a lower alkoxy group and a morpholino group, X a tetrahydropyranyloxy group, and "Acyl" a lower aliphatic acyl radical.

11. $\Delta^{5\cdot17}$ - 3 - ethylenedioxy - 11$\beta$:18 - oxido - 16 - hydroxy - 18 - tetrahydropyranyloxy - 20 - acetoxy - pregnadiene-21-acid morpholide.

12. Compounds of the formula

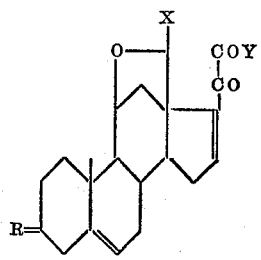

wherein R represents a ketalized oxo group, X a tetrahydropyranyloxy group, and Y a member of the group consisting of a morpholino group, a hydroxyl group, and a lower alkoxy group.

13. $\Delta^{5\cdot16}$ - 3 - ethylenedioxy - 11$\beta$:18 - oxido - 18 - tetrahydropyranyloxy-20-oxo-pregnadiene-21-acid.

14. $\Delta^{5\cdot16}$ - 3 - ethylenedioxy - 11$\beta$:18 - oxido - 18 - tetrahydropyranyloxy - 20 - oxo - pregnadiene - 21 - acid morpholide.

15. $\Delta^{5\cdot16}$ - 3 - ethylenedioxy - 11$\beta$:18 - oxido - 18 - tetrahydropyranyloxy - 20 - oxo - pregnadiene - 21 - acid methyl ester.

16. A member selected from the group consisting of a 11:18-cyclosemiacetal of $\Delta^4$-3:18:20-trioxo-11$\beta$-hydroxy-pregnene-21-acid-lower alkyl esters and 18-lower alkyl esters thereof.

17. 11:18-cyclosemiacetal of d:1-$\Delta^{4\cdot16}$-3:18:20-trioxo-11$\beta$-hydroxy-pregnadiene-21-acid methyl ester.

18. 11:18-cyclosemiacetal of d:1-$\Delta^4$-3:18:20-trioxo-11$\beta$-hydroxy-pregnene-21-acid methyl ester.

References Cited in the file of this patent
UNITED STATES PATENTS
2,844,513    Wettstein et al. _____ July 22, 1958

OTHER REFERENCES
Heusler et al.: Helv. Chim. Acta, vol. 41, No. 4, pages 997–1017 (June 1958).

UNITED STATES PATENT OFFICE
CERTIFICATION OF CORRECTION

Patent No. 3,002,971            October 3, 1961

Albert Wettstein et al.

It is hereby certified that error appears in the above numbered patent requiring correction and that the said Letters Patent should read as corrected below.

Columns 1 and 2, formula V should appear as shown below instead of as in the patent:

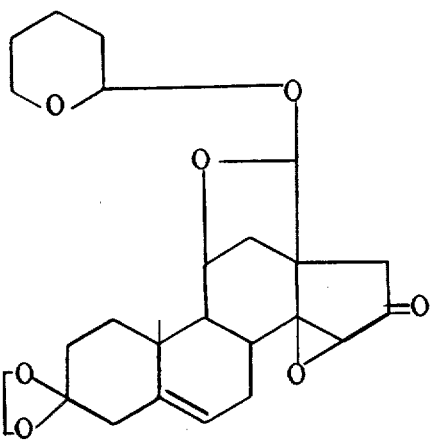

column 4, below formula XVI, for $$\downarrow \begin{array}{c} Cr_2O \\ pyridine \end{array} \quad \text{read} \quad \downarrow \begin{array}{c} CrO_3 \\ pyridine \end{array}$$

column 5, lines 19 to 21, the left-hand portion of partial structural formula should appear as shown below instead of as in the patent:

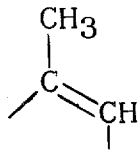

same column 5, line 61, for "16-ozo" read -- 16-oxo --; column 6, line 13, for "12-acid" read -- 21-acid --; column 11, line 30, after "166-168° C." insert -- Infrared spectrum in Nujol: 290μ (hydroxyl); 5.86μ (20-ketone) and 6.13μ (amide). --; column 12, line 23, for "7.38" read -- 738 --; line 36, for "-11β18-" read -- -11β:18- --; column 15, line 65, after "glacial" insert -- acetic --; column 16, line 37, for "(ester+2—CO)" read -- (ester+20-CO) --.

(SEAL)        Signed and sealed this 3rd day of July 1962.
Attest:

ERNEST W. SWIDER            DAVID L. LADD

Attesting Officer            Commissioner of Patents